United States Patent
Pietila et al.

(10) Patent No.: US 7,447,258 B2
(45) Date of Patent: Nov. 4, 2008

(54) METHOD FOR PERFORMING REACQUISITION IN A POSITIONING RECEIVER, AND AN ELECTRONIC DEVICE

(75) Inventors: Samuli Pietila, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/325,218

(22) Filed: Dec. 20, 2002

(65) Prior Publication Data

US 2003/0118086 A1 Jun. 26, 2003

(30) Foreign Application Priority Data

Dec. 21, 2001 (FI) .................................. 20012559

(51) Int. Cl.
*H04B 1/69* (2006.01)
(52) U.S. Cl. ...................................... 375/150; 375/130
(58) Field of Classification Search ................ 375/150, 375/147, 130; 342/357.01, 357.06, 375.06
See application file for complete search history.

(56) References Cited

U.S. PATENT DOCUMENTS

| | | | |
|---|---|---|---|
| 5,822,384 A | 10/1998 | Thebault et al. | |
| 5,912,644 A | 6/1999 | Wang | |
| 5,943,363 A * | 8/1999 | Hanson et al. | 375/150 |
| 6,118,808 A | 9/2000 | Tiemann et al. | |
| 6,278,404 B1 | 8/2001 | Niles | |
| 6,313,789 B1 * | 11/2001 | Zhodzishsky et al. | 342/357.12 |
| 2005/0080561 A1 * | 4/2005 | Abraham et al. | 701/213 |

FOREIGN PATENT DOCUMENTS

| | | |
|---|---|---|
| EP | 0 654 913 | 5/1995 |
| EP | 0939499 | 9/1999 |
| WO | 0126244 | 4/2001 |
| WO | 0194971 | 12/2001 |

* cited by examiner

*Primary Examiner*—Khai Tran
(74) *Attorney, Agent, or Firm*—Alfred A. Fressola; Ware, Fressola, Van Der Sluys & Adolphson LLP

(57) ABSTRACT

A method for performing reacquisition in a positioning receiver (PR) is described, in which at least one spread spectrum modulated signal is received. In the positioning receiver (PR), a reference signal is formed by using a reference code corresponding to the code used in the modulation of the signal to be received, and a correlation is made between the received signal and the reference signal. The correlation is made in at least a first and a second part, and different correlation times are used in the first part and in the second part. The invention also relates to an electronic device (ED) comprising a positioning receiver (PR) for performing this reacquisition method.

19 Claims, 2 Drawing Sheets

METHOD FOR PERFORMING REACQUISITION IN A POSITIONING RECEIVER, AND AN ELECTRONIC DEVICE

CROSS REFERENCE TO RELATED APPLICATIONS

This application claims priority under 35 USC §119 to Finnish Patent Application No. 20012559 filed on Dec. 21, 2001.

FIELD OF THE INVENTION

The present invention relates to a method for performing reacquisition in a positioning receiver, in which at least one spread spectrum modulated signal is received, a reference signal is formed by using a reference code corresponding to the code used in the modulation of the signal to be received, and the received signal and the reference signal are correlated. The invention also relates to an electronic device comprising a positioning receiver with means for receiving at least one spread spectrum modulated signal, means for forming a reference code corresponding to the code used in the modulation of the signal to be received, and means for making a correlation between the received signal and the reference signal.

BACKGROUND OF THE INVENTION

In positioning systems based on satellite positioning, a positioning receiver attempts to receive signals from at least four satellites in order to determine the position of the positioning receiver as well as the time data. An example of such a satellite positioning system is the GPS system (Global Positioning System), comprising a plurality of satellites orbiting the globe according to predetermined orbits. These satellites transmit Ephemeris data, on the basis of which the position of a satellite can be determined at each moment of time, in case the exact time data used in the satellite positioning system is known in the positioning receiver. In the GPS system, the satellites transmit a spread spectrum signal modulated with a code which is individual for each satellite. Thus, the positioning receiver can distinguish signals transmitted by different satellites from each other by using a reference code corresponding to a satellite code generated locally in the positioning receiver.

A problem in such positioning systems based on satellite positioning is often the fact that the signal transmitted by a satellite is strongly attenuated when it arrives at the positioning receiver, wherein it is very difficult to distinguish the signal from background noise. The signal is attenuated e.g. by climatic conditions and obstacles, such as buildings and surrounding ground topography on the path of the signal. It is particularly difficult to perform positioning inside a building, because the building itself strongly attenuates the signal transmitted by satellites and, on the other hand, multipath propagation may be strong, because possibly reflected signals coming for example through a window are not necessarily as attenuated as signals coming straight through the roof. In this case, the receiver may misinterpret the signal propagation time and the satellite position at the moment of transmission of the signal, due to e.g. said lag in the signal propagation time, caused by the multipath propagation Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo sequence. This pseudo sequence is different for each satellite. As a result of the modulation, a code-modulated wide-band signal is generated. This modulation technique allows the receiver to distinguish between the signals transmitted by different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

To detect the signals of the satellites and to identify the satellites, the receiver must perform acquisition, whereby the receiver searches for the signal of a satellite and attempts to be synchronized to this signal so that the data transmitted with the signal can be received and demodulated.

The positioning receiver must perform the acquisition e.g. when the receiver is turned on and also in a situation in which the receiver has not been capable of receiving the signal of any satellite for a long time. During the use of the positioning receiver, there may be situations, in which the positioning receiver, which has acquired and synchronized to the signal of a satellite, loses the synchronization. The reason for this may be that the positioning receiver is in motion and variations in the environment cause changes in the signal strength. Also indoors, there may be even large variations in the signal strength at different locations in a building. For example, in the vicinity of a window, the signal strength of a satellite can be considerably higher than in the centre part of the building. Also, there may be differences in the signal strength on different floors. In such a situation, the positioning receiver may lose its synchronization for a moment, and the positioning receiver should be able to perform reacquisition of the weakened signal as soon as possible so that the positioning receiver would not have to perform the actual acquisition process again.

The actual acquisition is performed at the stage when the positioning receiver has no information about the correct code phase of the satellite signal to be received. Thus, the positioning receiver must find out the correct code phase from all the possible different code phases, which, in the GPS system, means a total of 1023 possible code phases. Such a situation comes up, for example, in an independently operating positioning receiver which has not been capable of receiving a transmitted signal for some time. Typically, the length of such a blackout which requires acquisition is in the order of one minute or more. Also, if the positioning receiver has been switched off for a longer time, the actual acquisition must be performed.

Reacquisition refers to a situation, in which the positioning receiver knows, at the precision of a few chips, the code phase of the signal to be received. Thus, the search for the code phase can be limited to a few different code phases close to the correct code phase. Such a situation may come up, for example, when an independently operating positioning receiver is not capable of receiving a transmitted signal for a short time, typically for a few seconds. Also, in such a positioning receiver, in which auxiliary data is received from elsewhere than from a transmitter transmitting the signal to be received, the code phase is known at the precision of a few chips on the basis of the auxiliary data. In this case, the positioning receiver can execute a reacquisition process instead of the actual acquisition process. Such auxiliary data can be preferably transmitted via a mobile communication network or another communication method to the positioning receiver.

Almost all known GPS receivers utilize correlation methods for code acquisition and tracking. Also, correlation methods can be used for reacquisition. Reference codes ref(k), i.e. the pseudo random sequences for different satellites are stored or generated locally in the positioning receiver. A received signal is subjected to conversion to an intermediate frequency (down conversion), whereafter the receiver multiplies the received signal with the stored pseudo sequence. The signal obtained as a result of the multiplication is integrated or low-pass filtered. The presence of the satellite signal can be determined on the basis of this filtered or integrated signal. The multiplication is iterated in the receiver so that the phase of the pseudo random sequence stored in the receiver is shifted each time. The correct phase is determined from the correlation result preferably so that when the correlation result is the greatest, the correct phase has been found. Thus, the receiver is correctly synchronized with the received signal. After the code acquisition/reacquisition has been completed, the next steps are frequency tuning and phase locking.

In receivers according to prior art, attempts have been made to improve the reacquisition of a weak signal for example by using a long correlation time to achieve better distinguishability of correlation peaks. In practice, however, this means that the reacquisition time is long in all situations, also when it would not be required by the signal strength. Furthermore, the power consumption is increased as the correlation time is increased. On the other hand, if the reacquisition time is kept short, the positioning receiver does not operate well indoors and in other places where the signal strength is weak. In the design of the positioning receiver of prior art, the time used for reacquisition is thus determined by the weakest signal strength, at which the positioning receiver must be capable of performing reacquisition. Thus, to achieve an optimal solution, a compromise must be made between this time used for reacquisition and the weakest signal strength.

SUMMARY OF THE INVENTION

It is an aim of the present invention to provide an improved method for performing reacquisition in a positioning receiver. Another aim of the invention is to achieve an improved positioning receiver. To put it more precisely, the method according to the present invention is primarily characterized in that said correlation is performed in at least a first and a second part, and different correlation times are used in said first part and said second part. The electronic device according to the present invention is primarily characterized in that said means for performing the correlation comprise at least first correlating means and second correlating means for performing the correlation in at least a first and a second part, and means for using different correlation times in said at least first and second parts.

Considerable advantages are achieved by the present invention when compared with methods and positioning receivers of prior art. In the positioning receiver according to the invention, it is possible to perform fast reacquisition of a strong signal and still to achieve a sufficient sensitivity for reacquisition of a weak signal. Furthermore, in the positioning receiver according to the invention, no compromises need to be made with respect to the rate of the reacquisition and the lowest signal strength that can be received, wherein the positioning receiver can be used in an optimal way both outdoors and indoors. With the positioning receiver according to the invention, fast reacquisition can be performed with relatively high signal strengths, which improves the usability of the positioning receiver. Thus, for example when moving by a vehicle, reacquisition of a strong satellite signal can be performed at a location where the signal strength becomes stronger only for a moment. Such a situation may occur e.g. in a city, in which buildings attenuate the signal to a great extent. However, in a crossing area or in another more open place, the signal strength can be higher and fast reacquisition is possible. In the positioning receiver according to the invention, there is no need for two different operational modes for weak and strong signals, wherein reacquisition of both strong and weak satellite signals can be performed simultaneously.

DESCRIPTION OF THE DRAWINGS

In the following, the present invention will be described in more detail with reference to the appended drawings, in which.

DETAILED DESCRIPTION OF THE INVENTION

Figure 1:
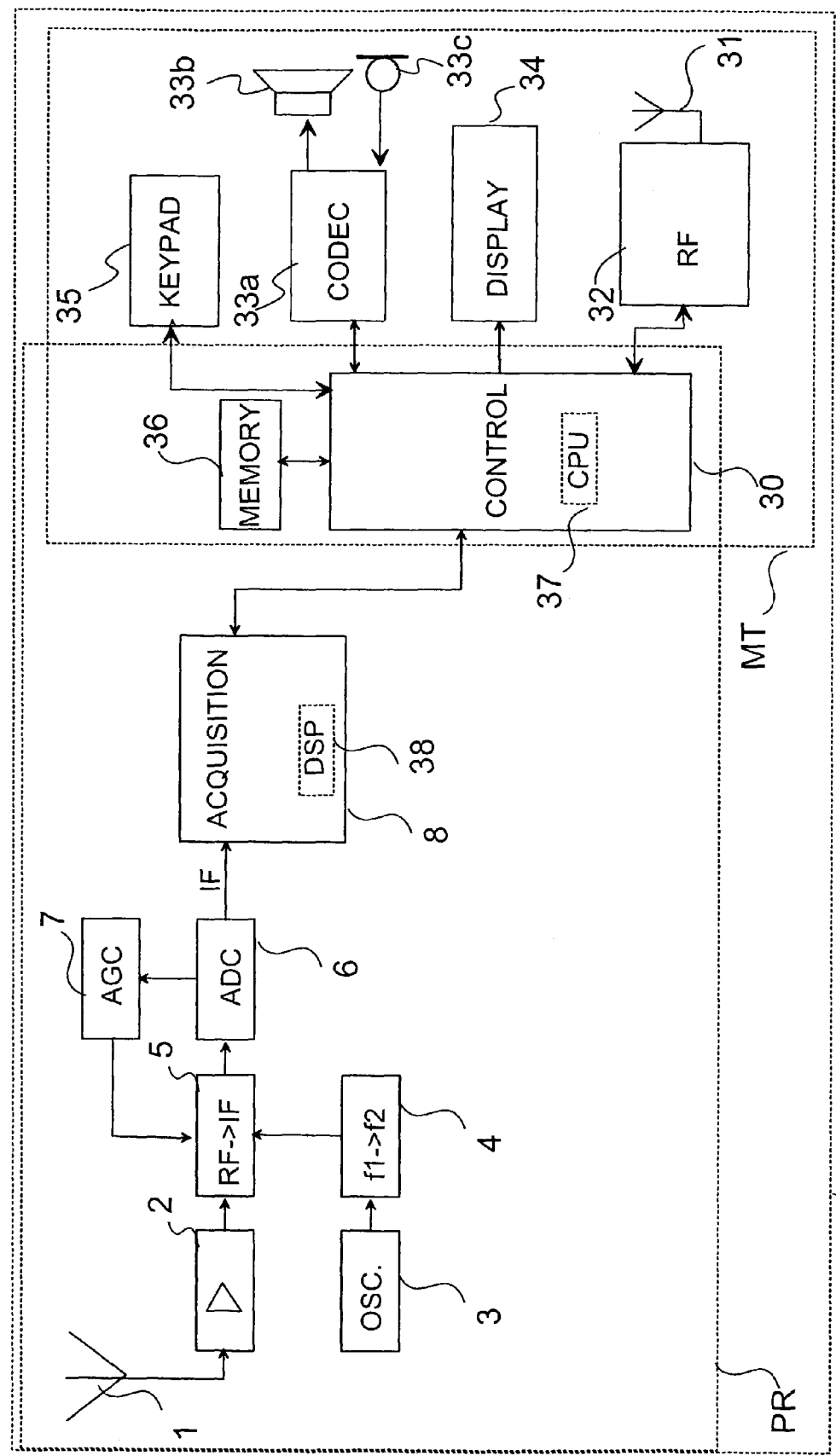
FIG. 1 shows an electronic device according to a preferred embodiment of the invention in a reduced block chart.

In the following, the operation of a receiver PR according to an advantageous embodiment of the invention will be described with reference to the reduced block charts of FIGS. 1 and 2. A spread spectrum modulated signal to be received via an antenna 1 is amplified in a high-frequency amplifier 2 and is modified, by means of a clock signal formed by a clock generator 3 and a frequency synthesizer 4, preferably to an intermediate frequency or directly to a baseband in a converter block 5. At this stage, the signal is preferably still in analog format, wherein it is converted to a digital signal in an analog-to-digital converter 6. The analog-to-digital converter 6 provides not only a digital receiving signal but also a control to an automatic gain control (AGC) block 7 to level out variations in strength of the received signal in a way known as such. The digital signal converted to an intermediate frequency or a baseband is led to one or more digital synchronization blocks 8 to perform conversion of the digital signal to two signals with different phases (I/Q), multiplication with a reference code, and correlation. In the synchronization block 8, the aim is to find out the code phase and frequency shift of the received signal on the basis of the correlation. The synchronization block 8 forms a feedback to adjust the code phase of the reference code and the receiving frequency, if necessary. After the code phase and the frequency shift have been determined, that is, the receiver has tracked the signal to be received, it is possible to start demodulation and storage of the navigation information transmitted in the signal, if necessary. A control block 30 preferably stores navigation information in a memory 36.

The control block 30 preferably comprises at least one processor 37 (central processing unit, CPU). In FIG. 1, a digital signal processing unit (DSP) 38 is shown to belong to the synchronization block 8, but it is obvious that the digital signal processing unit 38 can also be used in other functions than in connection with the synchronization block. In practice, the number of digital signal processing units 38 and/or processors 37 in electronic devices ED may be more than one. In some applications, signal processing functions can also be implemented in connection with the processor 37, wherein an actual digital signal processing unit 38 is not necessarily needed.

In the following, the operation of the method according to a preferred embodiment of the invention will be described in a situation of reacquisition. A positioning receiver PR contains stored information about a satellite, with which the positioning receiver has been synchronized, or this information can be received from a communication network (not shown), such as a mobile communication network. After the signal strength has become weaker, this stored information can be used in the positioning receiver, for example, to estimate the possible code phase of the signal. This may help to accelerate the reacquisition of the signal.

Figure 2:
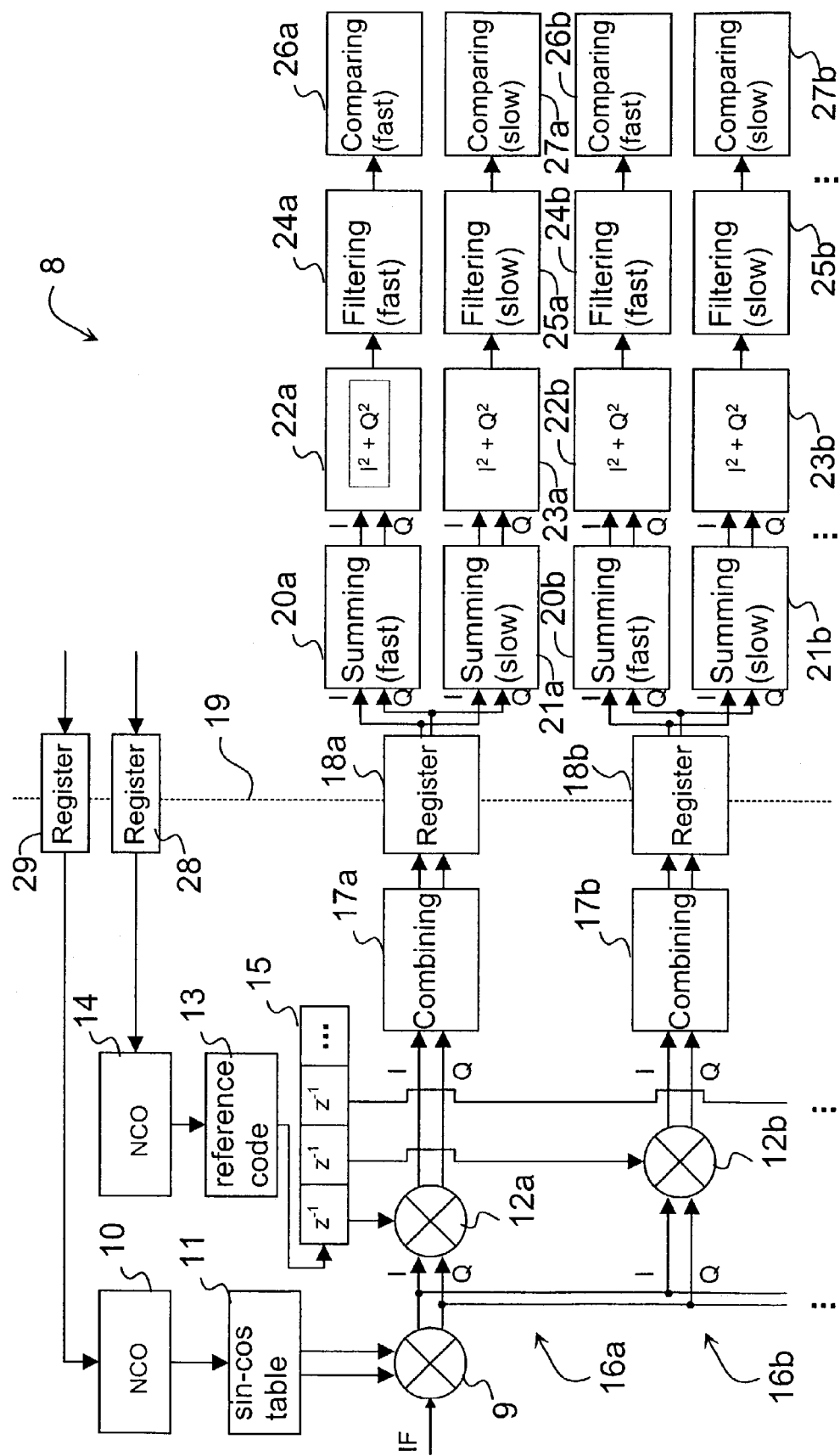
FIG. 2 shows an acquisition block according to a preferred embodiment of the invention in a reduced block chart.

An advantageous structure of the digital synchronization block 8 is presented in the block chart of FIG. 2 for one receiving channel. In practice, several receiving channels are normally used; however, their structure is substantially similar to that shown in FIG. 2, wherein the description of the operation of one receiving channel will be sufficient to understand the invention. In a first mixer 9 in the synchronization block 8, two sample signals I (in phase) and Q (quadrature phase) with different phases are formed from the received signal formed into digital samples. This is preferably achieved in such a way that the signal of a first numerically controlled oscillator 10 is transferred to a phase shift block 11, in which two signals with different phases are formed from the signal. The phase shift between these signals is about 90°. In the embodiment of FIG. 2, sine-cosine tables are used in the formation of the phase shift, but it is obvious that also other methods can be used in the phase shift block 11. The sample signals I, Q with different phases are transferred to each correlator branch 16a, 16b to perform correlation for the two-phase signal with different code phases. In FIG. 2, only two such correlator branches 16a, 16b are illustrated, but their number can also be more than two and their structure is substantially identical with that of the illustrated two correlator branches 16a, 16b. On the basis of the signals of these different correlator branches, it is possible to determine, for example, the phase of the reference code with respect to the code phase of the received signal. Each correlator branch comprises a second mixer 12a, 12b for multiplying the reference code with the sample signals I, Q. The reference code used at the time is the code used in the code modulation of the satellite whose reacquisition is pursued. The reference code is generated in a code generator 13, whose chipping rate is formed in a second numerically controlled oscillator 14. The reference code is led to a delay line 15, in which the reference code is delayed to generate reference codes with different code phases which are led to different correlator branches 16a, 16b of the synchronization block 8.

The invention can also be applied in such positioning receivers, in which only one correlator branch is used on each receiving channel. Thus, the delay line 15 is not necessarily needed, but the shift of the code phase is made by means of the code generator 13 and the second numerically controlled oscillator 14.

From the second mixer 12a, 12b, the mixing result is output to a combining block 17a, 17b to combine samples of the mixing result of the signal components I, Q formed in the second mixer from a given period of time, preferably an epoch (about 1 ms in the GPS system). The combining can be performed by addition, integration or in another corresponding way. At this stage, the different signal components I, Q are still processed separately, wherein the combining blocks 17a, 17b comprise two separately identical combining means, such as adders (not shown).

The combination results formed in the combining blocks 17a, 17b are preferably stored in a memory, such as registers 18a, 18b of the digital signal processing unit DSP. Thus, in the further processing steps, the results can be retrieved from these registers.

In the acquisition block according to an advantageous embodiment of the invention as shown in FIG. 2, the above-presented operations are implemented on the hardware level, and the following functions of the acquisition block are implemented as program codes of the digital signal processing unit DSP. This interface is illustrated by a broken line 19 in FIG. 2. However, it is obvious that in practice also other kinds of implementations can be used in connection with the present invention.

Each correlator branch 16a, 16b comprises at least first and second correlating means for performing the correlation in at least two parts. The first correlating means comprise a first coherent summing block 20a, 20b, a first non-coherent value forming block 22a, 22b, a first filtering block 24a, 24b, and a first comparing block 26a, 26b. In a corresponding manner, the second correlating means comprise a second coherent summing block 21a, 21b, a second non-coherent value forming block 23a, 23b, a second filtering block 25a, 25b, and a second comparing block 27a, 27b.

The digital signal processing unit DSP reads, at intervals, the values stored in the register 18a, 18b, and performs the coherent combining of the values in the first 20a, 20b and the second 21a, 21b coherent summing blocks. The combining time used in the first coherent summing block 20a, 20b is different from that used in the second coherent summing block 21a, 21b. In the example of FIG. 2, the purpose of the first coherent summing block 20a, 20b is to perform fast reacquisition of a strong signal, wherein the combining time is relatively short, for example in the order of 1 to 5 ms. In a corresponding manner, the purpose of the second coherent summing block 21a, 21b is to perform reacquisition of a weak signal, wherein the combining time is relatively long, for example in the order of 20 to 40 ms.

The coherent summing results are output from the first coherent summing block 20a, 20b to the first incoherent value forming block 22a, 22b at the stage when the combining time set for the first coherent summing block 20a, 20b has expired. In a corresponding manner, the coherent summing results from the second coherent summing block 21a, 21b are output to the second incoherent value forming block 23a, 23b at the stage when the combining time set for the second coherent summing block 22a, 22b has expired. The incoherent value forming blocks 22a, 22b; 23a, 23b form a value proportional to the magnitude of coherent values, i.e. a kind of a value proportional to the length of a vector. This can be preferably performed by raising the I and Q components of the coherent values to the power of two, and summing these values ($I^2 + Q^2$). Other calculation methods suitable for this purpose can also be used.

After the incoherent values have been formed, they are filtered in the first filtering block 24a, 24b and in the second filtering block 25a, 25b. In the filtering, low pass filtering is preferably used. In the filters, the combining time of the first and second filtering blocks is preferably taken into account so that the limit frequency of the low pass band is the lower, the longer said coherent summing time. Thus, in the example of FIG. 2, the limit frequency of the low pass filtering is higher in the first filtering block 24a, 24b than in the second filtering block 25a, 25b.

The values low pass filtered in the first filtering block 24a, 24b are led to the first comparing block 26a, 26b, and the values low pass filtered in the second filtering block 25a, 25b are led to the second comparing block 27a, 27b. In the first 26a, 26b and second 27a, 27b comparing blocks, the filtered values are compared with a given threshold value, and if the filtered value is preferably higher than the threshold value, it is determined that the sought signal has been found and its code phase has been determined. The correct code phase is found on the basis of the correlator branch 16a, 16b in which the threshold was exceeded, because the reference code is transferred to different correlator branches in different phases. Thus, the reacquisition step can be stopped for this satellite, and the tracking mode can be entered.

However, if no correlator branch 16a, 16b indicates acquisition, the above-presented steps can be iterated by using a different code phase and, if necessary, also by changing the receiving frequency. To adjust the code phase, the digital signal processing unit DSP stores a new value in a code phase control register 28. On the basis of this value, the frequency of the second numerically controlled oscillator 14 is changed. In a corresponding manner, to adjust the receiving frequency, the digital signal processing unit DSP stores a new value in a frequency control register 29 to adjust the frequency of the first numerically controlled oscillator 10.

The above-identified combining, coherent summing and filtering are performed in each correlator branch 16a, 16b in at least two parts, using a different combining time and filtering limit frequency. Also, the threshold value to be used in the comparison can be different for these different parts. However, it is obvious that the combining, coherent summing, filtering, and comparing can be performed in more than two parts, using a different combining time and filtering limit frequency for each part.

In the method according to the invention, each comparison is made in at least two parts; consequently, fast reacquisition can be performed for a strong signal, because the first comparing block 26a, 26b will detect the exceeding of the threshold value relatively fast. In a corresponding manner, for a weak signal, the second comparing block 27a, 27b will detect a possible exceeding of the threshold value, if the signal strength is sufficient for reacquisition in general. Consequently, in the method, there is no need to wait for the comparison result of the slower block, if it is possible to determine from the comparing by the fast block that the correct code phase has been found, and, on the other hand, there is no need to make compromises between the reacquisition time and the weakest signal strength that can be received.

The electronic device ED preferably also comprises means MT for performing the functions of a wireless communication device, such as a second antenna 31, a radio part 32, audio means, such as a codec 33a, a speaker 33b and a microphone 33c, a display 34, a keypad 35, and a memory 36. The control block 30 can be at least partly common to perform the functions of the receiver PR and to perform the functions of the wireless communication device MT, or separate processors or the like can be used for these functions.

Although the invention has been described above by using, as an example of a spread-spectrum modulated signal, a spread-spectrum modulated signal used in a satellite system and modulated with an individual code, the invention can also be applied in other systems which use spread spectrum modulation and in which the different states of the binary and other information are modulated with symbols.

It is obvious that the present invention is not limited solely to the above-presented embodiments, but it can be modified within the scope of the appended claims.

The invention claimed is:

1. A method for performing reacquisition in a positioning receiver comprising:
   receiving at least one spread spectrum modulated signal,
   forming a plurality of reference signals, each reference signal having a different code delay, each reference signal based on a reference code corresponding to the code used in the modulation of the signal to be received,
   summing the received signal and each reference signal using two different lengths of time so as to produce two different summed outputs based on the received signal and each reference signal, and
   making a correlation between the received signal and each reference signal, using said two different summed outputs based on the received signal and each reference signal so that said correlation is performed in at least a first part and a second part using said different lengths of time in said first part and in said second part to determine said correlation for said first part and for said second part.

2. The method according to claim 1, wherein two signals with different phases are formed from the received signal, for which correlation is performed in said at least first and second parts.

3. The method according to claim 1, further wherein each said correlation value is compared to a threshold value to determine signal acquisition of the received signal.

4. A method for performing reacquisition in a positioning receiver, comprising:
   receiving at least one spread spectrum modulated signal,
   forming a reference signal by using a reference code corresponding to the code used in the modulation of the signal to be received, and
   making a correlation between the received signal and the reference signal, wherein said correlation is performed in at least a first part and a second part, and different lengths of time are used in said first part and in said second part, wherein at least the following occurs in the correlation:
   combining the received signal and the reference signal for a time substantially corresponding to the length of the code used in the modulation,
   coherently combining the signals formed in the combining the received signal and the reference signal for the first part and the second part,
   determining a value proportional to the magnitude of the coherently combined signals for the first part and the second part,
   filtering said values proportional to the magnitude of the signals for a given filtering time for the first part and the second part, and
   comparing said filtered values, proportional to the magnitude of the signals, with a given threshold value, to determine signal acquisition on the basis of the comparison for the first part and the second part.

5. The method according to claim 4, wherein in the coherently combining the signals in the first part of the correlation, a shorter time is used than in the coherently combining the signals in the second part of the correlation.

6. The method according to claim 4, wherein in the filtering in the first part of the correlation, a higher limit frequency is used than in the filtering in the second part of the correlation.

7. The method according to claim 4, wherein code phase information related to the signal to be received is stored, wherein for reacquisition of the signal to be received, the code phase is estimated on the basis of the code phase information stored.

8. The method according to claim 4, wherein the reacquisition of the signal can be performed, when the comparing of one part indicates that said value, proportional to the magnitude of the signals, exceeds said threshold value.

9. An electronic device comprising a positioning receiver with a receiver for receiving at least one spread spectrum modulated signal, an acquisition module for forming a plurality of reference signals, each reference signal having a different code delay, each reference signal based on a reference code corresponding to the code used in the modulation of the signal to be received, and a synchronization block for performing a correlation between the received signal and each reference signal for reacquisition of the signal to be received, wherein said synchronization block for performing a correlation comprises at least a first correlator block and a second correlator block for making the correlation in at least first and second parts so that different lengths of time are used in said at least first correlator block and second correlator block to determine said correlation for said first part and for said second part, said first correlator block comprising first summing modules each for summing the received signal with one of said plurality of reference signals using a first length of time so as to produce a summed output, and first comparison modules corresponding to said first summing modules, each first comparison module for comparing said corresponding summed output with a threshold to determine said correlation, and said second correlator block comprising second summing modules each for summing the received signal with one of said plurality of reference signals using a second length of time so as to produce a summed output, and second comparison modules corresponding to said second summing modules, each second comparison module for comparing said summed output with a threshold to determine said correlation.

10. The electronic device according to claim 9, wherein it comprises a mixer for forming two signals with different phases from the received signal.

11. An electronic device for performing reacquisition of at least one spread spectrum modulated signal comprising:
   a positioning receiver for receiving the at least one spread spectrum modulated signal,
   said positioning receiver comprising an acquisition module:
   for forming a reference signal by using a reference code corresponding to the code used in the modulation of the signal to be received, and
   for making a correlation between the received signal and the reference signal, wherein said correlation is performed in at least a first part and a second part, and different lengths of time are used in said first part and in said second part, wherein said first correlator block and said second correlator block comprise:
   a first combining block for combining samples formed from the signal for a time substantially corresponding to the length of the code used in the modulation,
   a second combining block for performing coherent combination of the signals formed by the first combining block,
   a magnitude determining module for determining a value proportional to the magnitude of the coherently combined signals,
   a filter for filtering said values proportional to the magnitude of the signals for a given filtering time,
   a comparing module for comparing said filtered values, proportional to the magnitude of the signals, with a given threshold value, and
   a processor for determining the acquisition of the signal on the basis of the comparison.

12. The electronic device according to claim 11, wherein a shorter length coherent combining time is arranged to be used in the second combining block of the first correlator block than in the second combining block of the second correlator block.

13. The electronic device according to claim 11, wherein a higher limit frequency is arranged to be used in the filter of the first correlator block than in the filter of the second correlator block.

14. The electronic device according to claim 11, wherein it comprises a memory for storing code phase information related to the signal to be received, and an estimator for estimating the code phase on the basis of stored code phase information, to perform reacquisition of the signal to be received.

15. The electronic device according to claim 11, arranged to perform reacquisition of the signal after the comparison made at the comparing module for one part has indicated that said value proportional to the magnitude of the signals exceeds said threshold value.

16. The electronic device according to claim 11, wherein it comprises at least a first correlator branch and a second correlator branch each containing said at least first correlator block and second correlator block.

17. The electronic device according to claim 16, arranged to transfer the reference code in a different phase to each correlator branch.

18. A mobile station comprising a positioning receiver with means for receiving at least one spread spectrum modulated signal, means for forming a plurality of reference signals, each reference signal having a different code delay, each reference signal based on a reference code corresponding to the code used in the modulation of the signal to be received, and means for performing a correlation between the received signal and each reference signal for reacquisition of the signal to be received, wherein said means for performing a correlation comprise at least first correlating means and second correlating means for making the correlation in at least a first part and a second part, and means for using different lengths of time in said at least first part and second part so as to determine said correlation for said first part and for said second part, said first correlating means comprising first means for summing the received signal with one of said plurality of reference signals using a first length of time so as to produce a first summed output, and first means for comparing said first summed output with a threshold to determine said correlation, and said second correlating means comprising second means for summing the received signal with one of said plurality of reference signals using a second length of time so as to produce a second summed output, and second means for comparing said second summed output with a threshold to determine said correlation.

19. The mobile station according to claim 18, wherein said first and second means for summing perform
- coherent combining of the signals, and wherein the first and second correlating means each comprise
- magnitude determining means for determining a value proportional to the magnitude of the coherently combined signals, and
- filtering means for filtering said values proportional to the magnitude of the signals for a given filtering time,
- wherein said first and second means for comparing each compares said filtered values, proportional to the magnitude of the signals, with a given threshold value, and wherein said mobile station further comprises
- determining means for determining the acquisition of the signal on the basis of the comparison.

* * * * *